(12) United States Patent
Pasquier et al.

(10) Patent No.: US 11,014,284 B2
(45) Date of Patent: May 25, 2021

(54) METHOD AND UNIT FOR THERMAL CONDITIONING, WHICH COMPRISES EMITTERS WITH GRADUAL IGNITION AND EXTINGUISHMENT

(71) Applicant: SIDEL PARTICIPATIONS, Octeville-sur-Mer (FR)

(72) Inventors: Hervé Pasquier, Octeville-sur-Mer (FR); Yoann Lahogue, Octeville-sur-Mer (FR); Denis Souffes, Octeville-sur-Mer (FR); Guy Feuilloley, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 326 days.

(21) Appl. No.: 16/114,689

(22) Filed: Aug. 28, 2018

(65) Prior Publication Data

US 2019/0061224 A1 Feb. 28, 2019

(30) Foreign Application Priority Data

Aug. 28, 2017 (FR) ...................................... 1757925

(51) Int. Cl.

| B29C 49/64 | (2006.01) |
| B29C 49/68 | (2006.01) |
| B29C 35/08 | (2006.01) |
| B29B 13/02 | (2006.01) |
| B29L 31/00 | (2006.01) |
| B29K 67/00 | (2006.01) |
| B29K 105/00 | (2006.01) |

(Continued)

(52) U.S. Cl.
CPC ........ *B29C 49/6418* (2013.01); *B29B 13/024* (2013.01); *B29C 35/0805* (2013.01); *B29C 49/68* (2013.01); *B29C 49/06* (2013.01); *B29C 49/36* (2013.01); *B29C 2035/0838* (2013.01); *B29K 2067/003* (2013.01); *B29K 2105/258* (2013.01); *B29L 2031/7158* (2013.01)

(58) Field of Classification Search
None
See application file for complete search history.

(56) References Cited

U.S. PATENT DOCUMENTS

| 4,207,063 A * | 6/1980 | Sugita | ..................... B29C 49/68 |
| | | | 219/388 |
| 4,233,010 A * | 11/1980 | Suzuki | ..................... B29C 49/12 |
| | | | 264/535 |

(Continued)

OTHER PUBLICATIONS

French search report, FR 1757925, dated Apr. 17, 2018.

*Primary Examiner* — Monica A Huson (57) ABSTRACT

Method for thermal conditioning, within a thermal conditioning unit that is equipped with a row of adjacent emitters that each comprise a number of monochromatic electromagnetic-radiation sources, of a queue of preforms of containers having a head preform or a tail preform, with this method comprising the following operations: Periodically determining the position of the head preform, or, respectively, of the tail preform; As the queue of preforms moves along, gradually igniting the emitters that are located downstream and in the vicinity of the head preform or, respectively, gradually extinguishing the emitters that are located upstream and in the vicinity of the tail preform.

20 Claims, 5 Drawing Sheets

(51) Int. Cl.
  *B29C 49/36* (2006.01)
  *B29C 49/06* (2006.01)

(56) References Cited

U.S. PATENT DOCUMENTS

| | | | |
|---|---|---|---|
| 5,681,521 A * | 10/1997 | Emmer | B29C 49/6436 |
| | | | 264/521 |
| 6,514,448 B1 * | 2/2003 | Vogel | B29C 49/4205 |
| | | | 264/346 |
| 8,921,808 B2 | 12/2014 | Feuilloley et al. | |
| 2014/0305919 A1 | 10/2014 | Bellec et al. | |
| 2017/0136682 A1 | 5/2017 | Lahogue et al. | |
| 2017/0215232 A1 | 7/2017 | Feuilloley et al. | |

* cited by examiner

METHOD AND UNIT FOR THERMAL CONDITIONING, WHICH COMPRISES EMITTERS WITH GRADUAL IGNITION AND EXTINGUISHMENT

The invention relates to the manufacturing of containers from preforms made of plastic material such as PET.

This manufacturing ordinarily comprises:

A first phase for thermal conditioning (also called heating) of preforms, conducted within a thermal conditioning unit (also called a furnace) that defines a heating cavity, with this first phase consisting in moving the preforms into the cavity to bring them to a temperature that exceeds the glass transition temperature of the material (which is, for PET, approximately 80° C.);

A second phase for forming containers from preforms, conducted within a forming unit that is equipped with molds bearing the impression of the container model to be formed, this second phase consisting in inserting each hot preform into a mold and in injecting a pressurized fluid (in particular a gas, typically air) into it to flatten it against the mold and thus to impart to it the impression of the container model.

The conventional furnaces are equipped with halogen-type incandescent lamps that radiate according to Planck's Law over a continuous spectrum, associated with ceramic reflectors.

Before launching any production, it is advisable to preheat the furnace in order to bring the lamps and the reflectors to an appropriate temperature that can impart to the preforms a thermal profile that makes it possible subsequently to carry out the forming effectively.

This preheating is slow and requires delicate adjustments.

An alternative heating technology has been produced recently, however, based on the use of emitters equipped with monochromatic electromagnetic-radiation sources (in particular lasers), whose emission spectrum essentially extends into the infrared range. A furnace that operates using this technology, illustrated by the European Patent Application EP3119582 (Sidel Participations), has many advantages in relation to a conventional furnace with halogen lamps. Among other things, this type of furnace:

Radiates little heat and therefore does not require ventilation, unlike a halogen furnace;

Makes it possible to heat the preforms according to more precise thermal profiles;

Does not require preheating.

This last advantage is decisive in terms of productivity: it becomes possible to start up production without preheating, and therefore immediately; it is actually sufficient to activate the forming unit, to ignite the thermal conditioning unit (i.e., to supply the emitters with current), and to initiate the travel of a queue of preforms.

Quality defects are noted, however, during the transitory phases of the beginning and end of production.

Thus, it is noted, at the beginning of production, that at least the first preform (called the head preform) that enters into the furnace has an unsatisfactory heating profile. More precisely, the head preform appears to be superheated, i.e., its mean temperature is too high, and its forming leads to a poor-quality container that should be discarded. The same is often true of several preforms that follow the head preform.

This defect is also noted, at the end of production, at least on the last preform (called the tail preform) of the queue as well as (often) on the several preforms that precede it.

The purpose of the invention is to propose a solution that makes it possible to eliminate this problem, owing to a thermal conditioning method that makes it possible to impart to the head and tail preforms an acceptable thermal profile, and whose forming consequently leads to containers having the required quality.

For this purpose, in the first place, a method for thermal conditioning of a queue of preforms of containers made of plastic material within a thermal conditioning unit that defines a heating cavity and that is equipped with a row of adjacent emitters that border the cavity and that each comprise a number of monochromatic electromagnetic-radiation sources is proposed, with each preform being attached to an individual support that travels from upstream to downstream along a predetermined path in the cavity, with the queue of preforms ending on the downstream side by a head preform or on the upstream side by a tail preform, with each emitter being able to adopt an ignited state, in which the sources emit radiation into the cavity, and an extinguished state, in which the sources do not emit radiation into the cavity, with this method comprising the following operations:

Periodically determining the position, on the path, of the head preform, or, respectively, of the tail preform;

As the queue of preforms moves along, gradually igniting the emitters that are located downstream and in the vicinity of the head preform or, respectively, gradually extinguishing the emitters that are located upstream and in the vicinity of the tail preform.

The determination of the position of the head preform or the tail preform can be carried out by means of one or more sensors, such as a coder or a detection cell.

This method comprises, for example, the ignition of the emitter that is located immediately downstream from the head preform, with the emitters that are located downstream from this emitter being kept extinguished and the emitters that are located upstream from this emitter being kept ignited.

This method can comprise the gradual increase, from upstream to downstream, of electric power provided to multiple emitters that are located downstream from the head preform that is close to the latter, until a nominal power is reached at the earliest when the latter passes by.

The ignited state of the emitters is preferably maintained until the passage of the tail preform is detected.

In a corresponding manner, the method can comprise, for example, keeping the emitter that is located immediately upstream from the tail preform ignited, with the emitters that are located upstream from this emitter being extinguished and the emitters that are located downstream from this emitter being kept ignited.

The method can comprise the gradual reduction, from upstream to downstream, of electric power provided to multiple emitters that are located upstream from the tail preform as the departure of the latter proceeds, from a nominal power to extinguishment.

In the second place, there is proposed a unit for thermal conditioning of preforms of containers made of plastic material, which defines a heating cavity and is equipped with:

A row of adjacent emitters that border the cavity and that each comprise a number of monochromatic electromagnetic-radiation sources, with each emitter being able to adopt an ignited state, in which the sources emit radiation into the cavity, and an extinguished state, in which the sources do not emit radiation into the cavity;

A series of individual supports for the preforms, traveling from upstream to downstream along a predetermined path in the cavity;

One or more sensors that are capable of making possible the periodic determination of the position, on the path, of a head preform, or, respectively, of a tail preform within a queue of preforms that travel in the cavity;

A monitoring unit that is programmed gradually to ignite the emitters that are located downstream and in the vicinity of the head preform or, respectively, gradually to extinguish the emitters that are located upstream and in the vicinity of the tail preform.

The sources are preferably configured to emit in the infrared range. These are, for example, VCSEL diodes.

Other objects and advantages of the invention will become evident from the description of an embodiment, given below with reference to the accompanying drawings, in which.

The drawings show a unit 1 for thermal conditioning of preforms 2 of containers made of plastic material, for example polyethylene terephthalate (PET).

Each preform 2 has an essentially cylindrical body 3, closed at one end by a hemispherical bottom 4 and extending at an opposite end by an open neck 5 whose shape is definitive and that is designed to form a lip on the container.

The preforms 2 are shown with their necks 5 oriented upward, but they could be oriented with their necks downward.

The thermal conditioning unit 1, more simply named "furnace" below, is configured to heat the preforms 2 to a temperature that exceeds the glass transition temperature of their material. In the case of PET, whose glass transition temperature is approximately 80° C., the preforms 2 are, for example, heated to a temperature that is higher than or equal to 100° C.

After having been softened by heating within the furnace 1, each preform 2 is designed to undergo in a mold a forming operation (for example, blow molding or stretch blow molding) to form a container such as a bottle or a flask.

Figure 1:
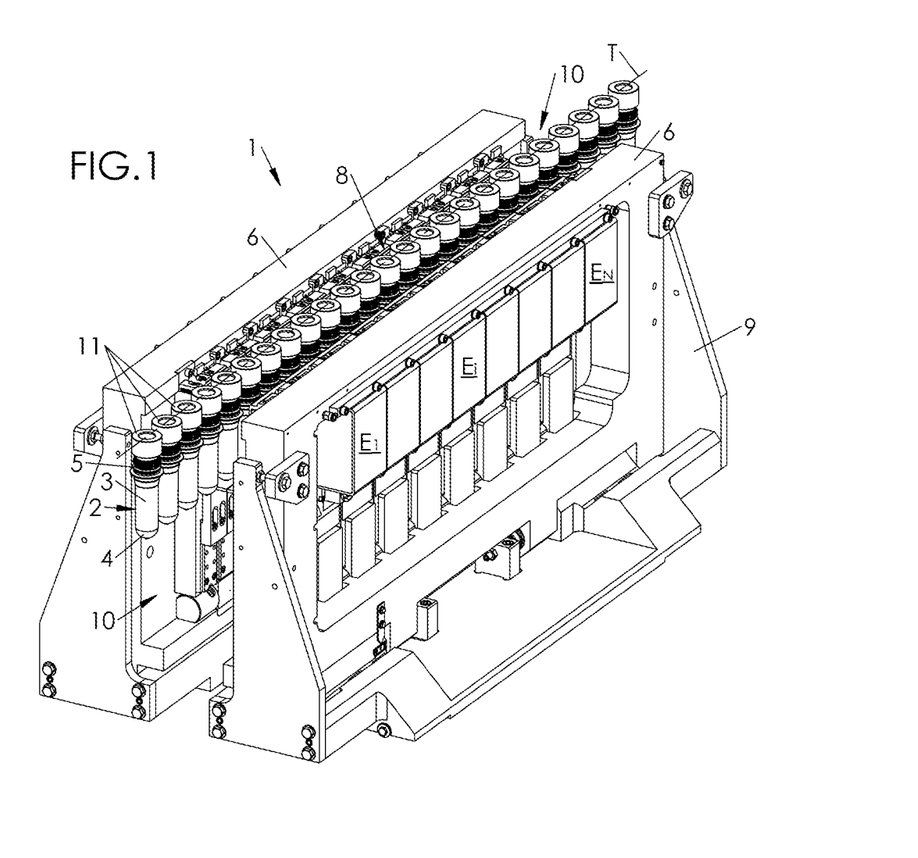
FIG. 1 is a perspective view that shows a unit for processing preforms of containers, comprising a series of adjacent heating modules.

As can be seen in particular in FIG. 1, the furnace 1 comprises two opposite longitudinal walls 6 that have inner faces 7 opposite and that define together a cavity 8 within which the preforms 2 travel. As can be seen in FIG. 1, the furnace 1 comprises a frame 9 on which the longitudinal walls 6 are mounted.

The longitudinal walls 6 define with one another, at at least one (or at each) end of the cavity 8, an opening 10 for the passage of the preforms 2. In practice, the cavity 8 has (as illustrated in FIG. 1), two opposite ends that each define an opening 10 for the passage of the preforms 2.

Each preform 2 is attached (here by its neck 5) to an individual support 11, called "spinner," with travels from upstream to downstream along a predetermined path T in the cavity 8. In practice, the spinners 11 are mounted on a chain that travels on wheels, at least one of which is driven in rotation by a motor.

Figure 2:
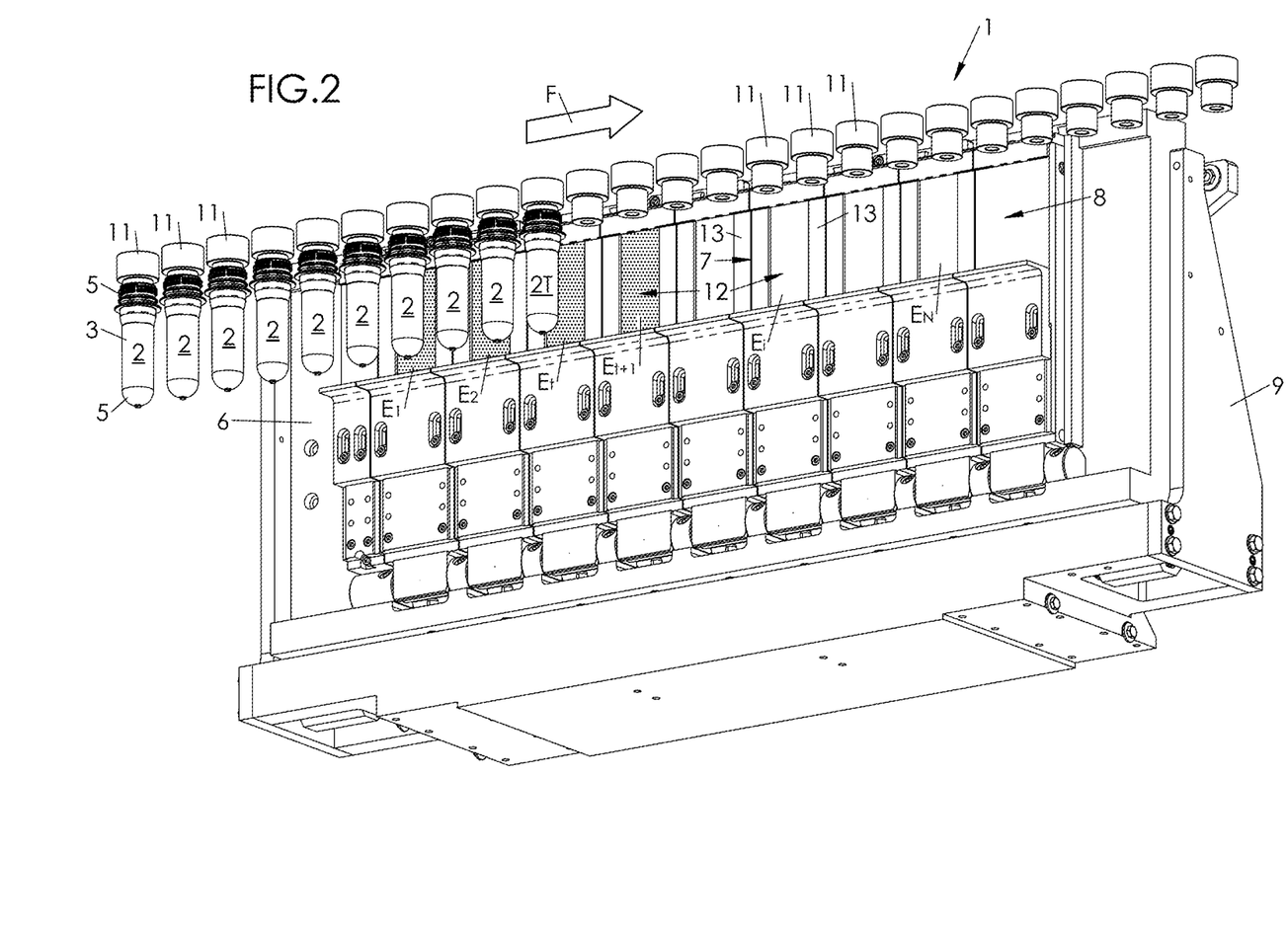
FIG. 2 is a partial perspective view, from another angle of observation, of the processing unit of FIG. 1 that operates under transient ignition conditions, during which the heating modules are gradually ignited.
Figure 3:
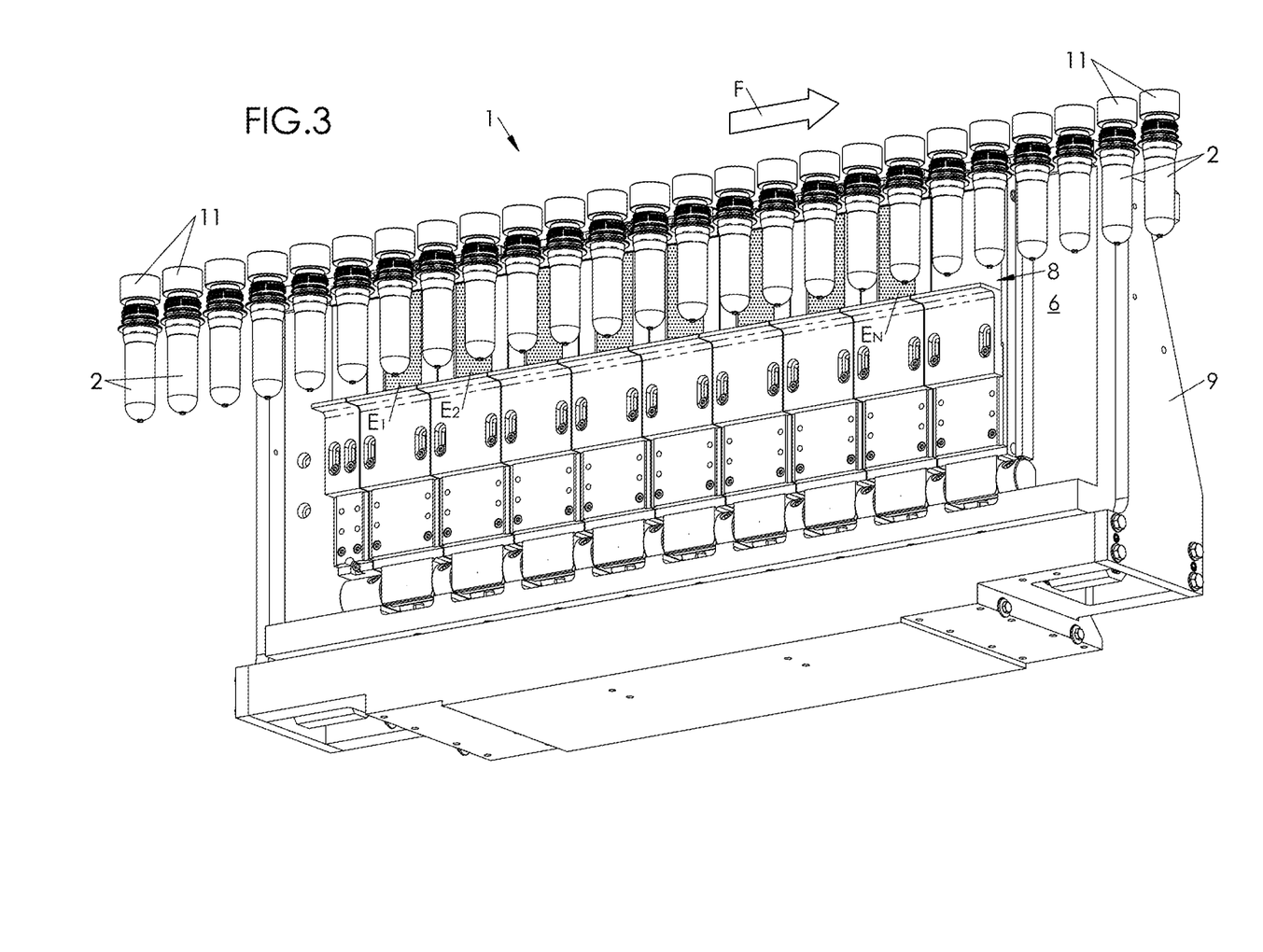
FIG. 3 is a view that is similar to FIG. 2, illustrating the operation of the processing unit in permanent mode.
Figure 4:
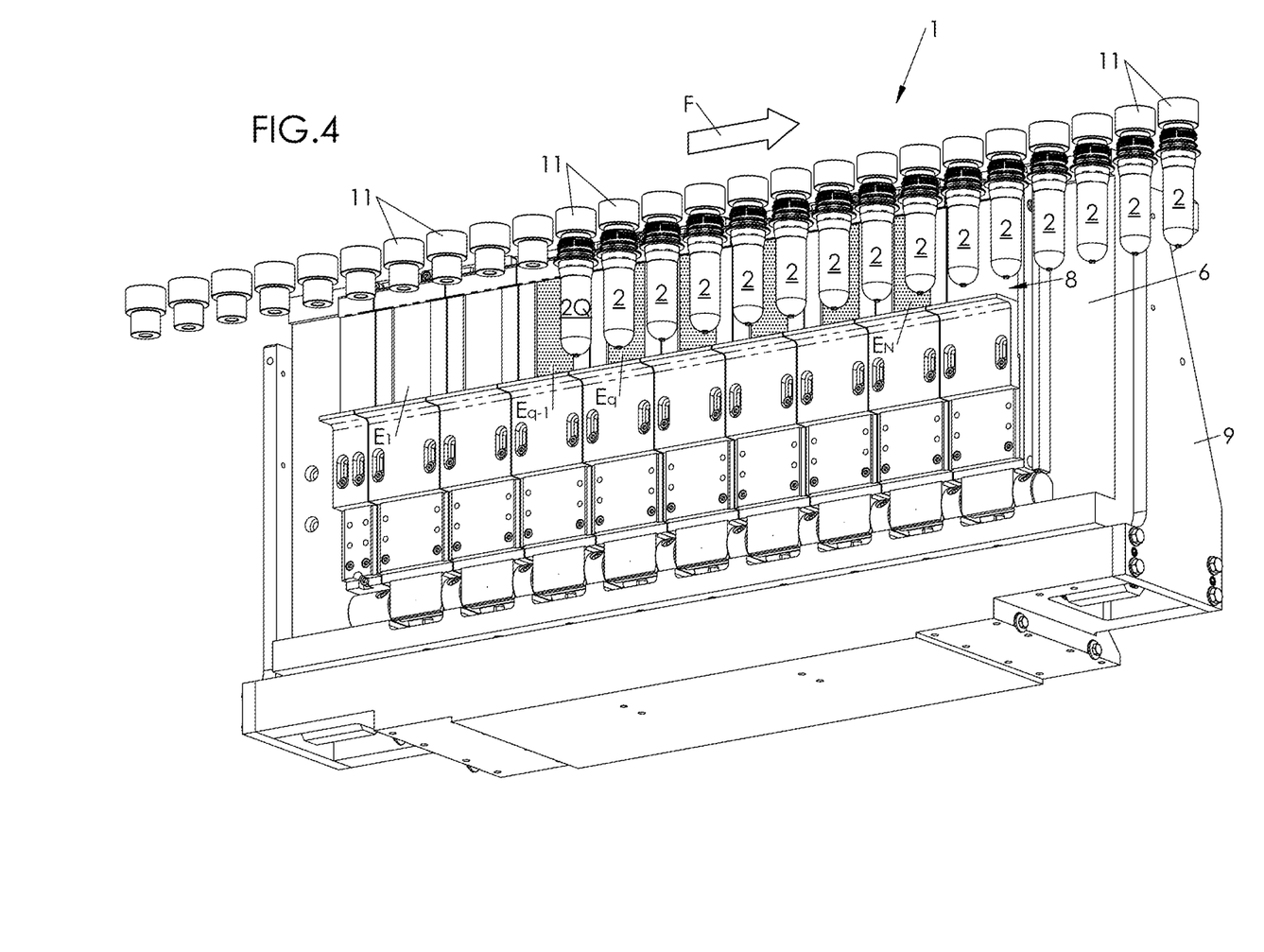
FIG. 4 is a view that is similar to FIG. 2, showing the processing unit that operates under transient extinguishment conditions, during which the heating modules are gradually extinguished.

In the example that is illustrated in FIG. 2, FIG. 3, and FIG. 4, the path T is linear overall (as suggested by the arrow F in FIG. 2), but it could be curved (at least locally), in particular according to the configuration of the sites in which the furnace 1 is installed. In the example that is illustrated in FIG. 1, the preforms 2 travel in the cavity 8 in a single row, but they could travel in several rows, as is described in the above-mentioned application EP3119582.

Each preform 2 is also driven in rotation around its axis by its spinner 11.

At least one of the walls 6 comprises a row of adjacent emitters that border the cavity and that each comprise a number of electromagnetic-radiation sources. The number of emitters is denoted N (N an integer that is strictly greater than 1), and each emitter is denoted $E_i$ (i an integer such that $1 \leq i \leq N$, with i increasing from upstream to downstream).

The sources of each emitter $E_i$ are selected to emit a monochromatic radiation, in the infrared range.

In theory, a monochromatic source is an ideal source that emits a single-frequency sine wave. In other words, its frequency spectrum consists of a single line of zero spectral width (Dirac).

In practice, such a source does not exist, a real source having a frequency emission spectrum that extends over a small but non-zero spectral bandwidth, centered on a main frequency where the intensity of the radiation is maximum. For the requirements of this application, such a real source is considered to be monochromatic. Likewise, for the requirements of this description, a multi-mode source is considered to be monochromatic, i.e., a source that emits on a discreet spectrum that comprises multiple narrow bands that are centered on different main frequencies.

The advantage of a monochromatic radiation is that, properly selected, it can be concentrated on one (or more) frequency(ies) for which the thermal behavior of the material of the preforms 2 is, in terms of absorption, particularly advantageous.

By way of example, to ensure fast surface heating of the preforms 2, it is possible to select one (or more) frequency (ies) in the infrared for which the material is very absorbent. In contrast, to ensure slower but more homogeneous heating in the thickness of the preforms 2, it is possible to select one (or more) frequency(ies) for which the material is relatively less absorbent.

In practice, the sources with which the emitters $E_1 \ldots E_N$ are equipped are lasers (for example, laser diodes), emitting in the infrared and organized by juxtaposition and superposition to form one or more matrices.

In this case, each matrix can be a matrix of vertical cavity surface emitting laser (VCSEL) diodes, with each diode emitting, for example, a laser beam with a unit power on the order of 1 watt with a wavelength of approximately 1 μm.

These sources are radiant, i.e., the radiation that is emitted is transmitted to the preforms 2 without air being used as a transmission vector.

In the example that is illustrated in FIG. 2, FIG. 3, and FIG. 4, where for purposes of clarity only one wall 6 is shown, the (or each) wall 6 is equipped with multiple emitters $E_i$ that are aligned side by side.

In this same example, each emitter $E_i$ comprises a window 12 through which the sources and a pair of reflectors 13, which border each window 12 on both sides, radiate. Each reflector 13 is, for example, a plate made of polished metal (or coated with a metallized layer) that has a specular-quality surface state.

Each emitter $E_i$ can adopt an ignited state (in gray in FIG. 2, FIG. 3, FIG. 4, and FIG. 5), in which its sources effectively emit radiation into the cavity 8, and an extinguished state (in white in FIG. 2, FIG. 3, FIG. 4, and FIG. 5), in which its sources do not emit radiation into the cavity 8.

Each emitter $E_i$ delimits in the cavity 8 an elementary volume, referred to as cell below, which is denoted $C_i$ (with i the same index as above). The sum of the cells $C_i$ constitutes the inner volume of the cavity 8.

For each emitter $E_i$, the furnace 1 comprises a power supply 14 by which electrical energy that the sources convert into an electromagnetic field that is radiated into the cavity 8 can be provided to the emitter $E_i$.

Assuming that each emitter $E_i$ offers a constant yield (denoted $R_i$), the power (denoted $P_C^i$) of the electromagnetic field that is radiated by this emitter $E_i$ is linked by a proportionality equation to the electric power (denoted $P_E^i$) that is provided for it:

$$P_C^i = R_i \cdot P_E^i$$

The furnace 1 advantageously comprises, for each power supply 14, a power variable-speed drive unit 15. This variable-speed drive unit 15 can be analog or, preferably, electronic. In this case, the furnace 1 comprises an electronic (or computer) monitoring unit 16, which controls each variable-speed drive unit 15.

The variable-speed drive units 15 can be controlled simultaneously and in an automatic manner by the monitoring unit 16, which for this purpose comprises a computer program that is implemented on a memory connected to (and controlled by) a microprocessor.

The electric power that is provided to each emitter $E_i$ has a non-zero nominal value $P_{Enom}^i$, and a minimum value $P_{Emin}^i$ that can be zero.

A nominal electromagnetic power $P_{Cnom}^i$ that is radiated by each emitter $E_i$ corresponds to the nominal power $P_{Enom}^i$ that is provided:

$$P_{Cnom}^i = R_i \cdot P_{Enom}^i$$

Likewise, a minimum electromagnetic power denoted $P_{Cmin}^i$ that is radiated by each emitter $E_i$ corresponds to the minimum power $P_{Emin}^i$ that is provided:

$$P_{Cmin}^i = R_i \cdot P_{Emin}^i$$

Since the electric power $P_E^i$ that is provided (and therefore the electromagnetic power $P_C^i$) is not zero, the emitter $E_i$ is in a so-called "ignited" state, i.e., its sources emit radiation into the cavity 8.

The nominal electromagnetic power $P_{Cnom}^i$ is the power that, in the steady-state mode (i.e., at full production and at the normal production rate), is to be radiated by each emitter $E_i$ to ensure that at the outlet of the cavity 8, each preform 2 has an acceptable temperature profile that makes it possible to form a container of acceptable quality.

In contrast, $P_{Cmin}^i$ is zero if $P_{Emin}^i$ is zero. In this case, the emitter $E_i$ is in a so-called "extinguished" state, i.e., its sources do not emit any radiation into the cavity 8.

For each emitter $E_i$, the variable-speed drive unit 15 makes it possible to adjust the electric power $P_E^i$ that is provided to a fraction of the nominal electric power $P_{Enom}^i$:

$$P_E^i = K_i \cdot P_{Enom}^i$$

where $K_i$ is a proportionality coefficient, positive real number, or zero (corresponding to extinguishment in this latter case), associated with the emitter $E_i$.

The preforms 2 are transported by queue, with each queue comprising a series of adjacent preforms 2 and ending, on the downstream side, by a head preform 2T or, on the upstream side, by a tail preform 2Q. Note that a queue of preforms 2 can be of great length, with the tail preform 2Q coming many hours (and even multiple days) after the head preform 2T.

At the beginning of production, a queue of preforms 2 ends on the downstream side by a head preform 2T. As illustrated in FIG. 2, downstream from the head preform 2T, the spinners 11 are empty. At the beginning of production, the head preform 2T is the first to enter into the furnace 1.

At the end of production, a queue of preforms 2 ends by a tail preform 2Q. As illustrated in FIG. 4, upstream from the tail preform 2Q, the spinners 11 are empty. At the end of production, the tail preform 2Q is the last to leave the furnace 1.

Ordinarily, at the beginning of production, all of the emitters $E_1 \ldots E_N$ are ignited simultaneously before the head preform 2T arrives in the furnace 1.

Likewise, at the end of production, all of the emitters $E_1 \ldots E_N$ are extinguished simultaneously after the tail preform 2Q exits from the furnace 1.

This operation is not satisfactory: on the one hand, it does not make it possible to optimize the electrical consumption of the furnace 1; secondly, it turns out that at the beginning of production, the head preform 2T is superheated (this is often the case of several preforms 2 that follow it), and in the same manner, at the end of production, the tail preform 2Q is superheated (this is often the case of several preforms 2 that precede it).

To prevent this discrepancy, it is proposed, at the beginning of production, gradually to ignite, from upstream to downstream, as the queue of preforms 2 moves along, the emitters $E_j \ldots E_k$ that are located downstream and in the vicinity of the head preform 2T (assumed to be located opposite an emitter $E_t$, FIG. 2), where t, j and k are integers that are less than or equal to N, with:

1≤j≤N j≤t or j≥t k>t

The emitter $E_t$ that is located opposite the head preform 2T does not necessarily reach its nominal power at the very moment that the head preform 2T passes it. The same may hold true for one or more emitters $E_j$ that are located upstream from the head preform 2T (case where j≤t).

Likewise, at the end of production, it is provided gradually to extinguish, from upstream to downstream, as the queue of preforms 2 moves along, the emitters $E_1 \ldots E_m$ that are located upstream and in the vicinity of the tail preform 2Q (assumed to be located opposite an emitter $E_q$, FIG. 4), where q, l, m are integers that are less than or equal to N, with:

q<N l<q m≤t or m≥t

The emitter $E_q$ that is located opposite the tail preform 2Q does not necessarily have its nominal power at the time the head preform 2Q passes it. The same may hold true for one or more emitters $E_m$ that are located downstream from the head preform 2Q (case where m≥t).

Be that as it may, it is necessary that the position, along the path T, of the head preform 2T or, respectively, of the tail preform 2Q, be known.

Figure 5:
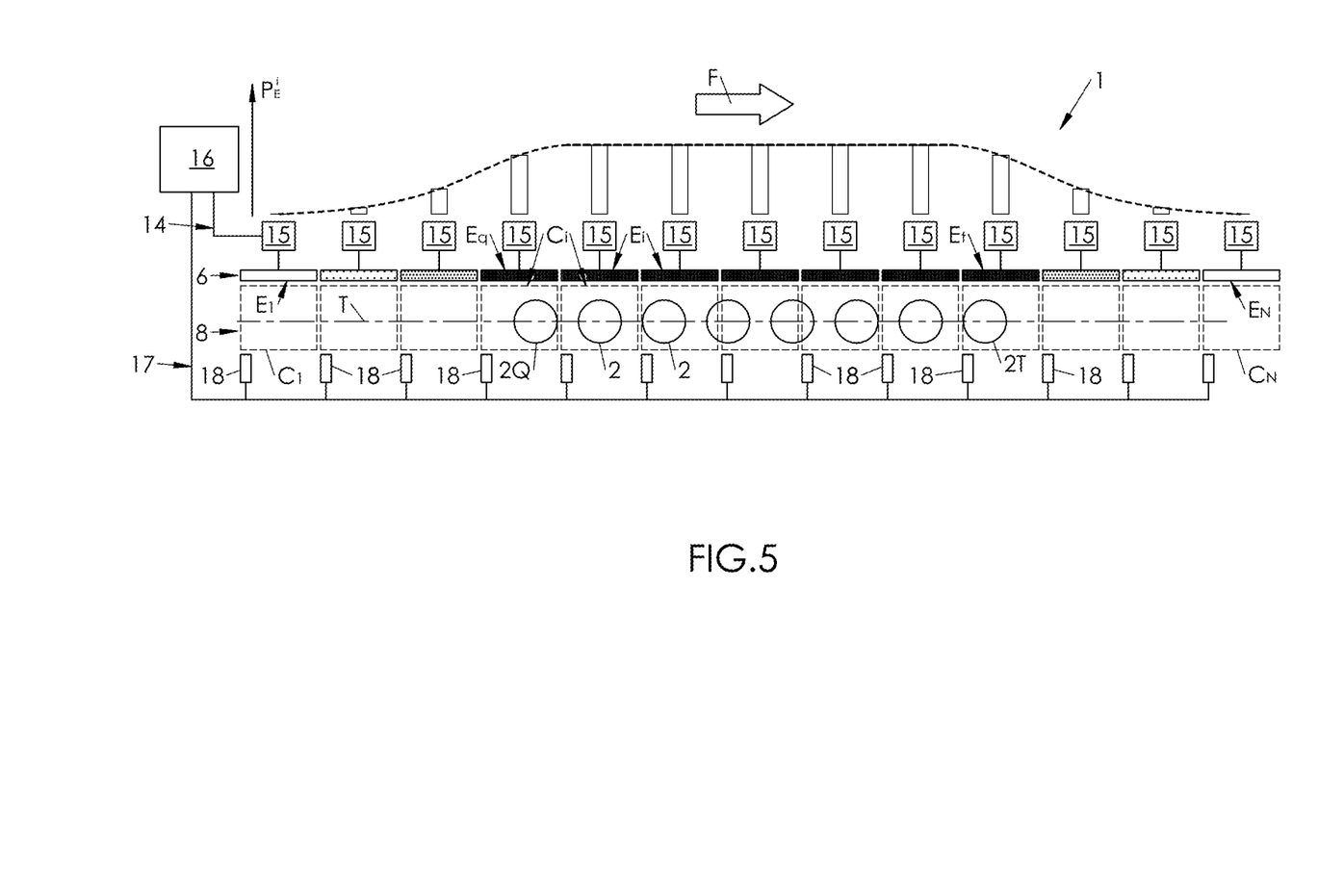
FIG. 5 is a diagrammatic view that illustrates the ignition and extinguishment control of the heating modules.

This is why, as shown in a diagram in FIG. 5, the furnace 1 is equipped with a detection system 17, configured to determine in a periodic manner the position, on the path T, of the head preform 2T or the tail preform 2Q.

In the case where the spinners 11 are mounted on a chain that travels on a wheel, this wheel can be equipped with a coder that provides the angular position thereof. Starting from an initial position that is detected for the head preform 2T (for example, by means of a cell that is located at the outlet of a system for supply of preforms 2) and by knowing the step, i.e., the distance between two spinners 11 (and thus between two preforms 2) in succession, it is easy to calculate the instantaneous position of the head preform 2T (or of the tail preform 2Q) along the path T.

As a variant and as illustrated, this system 17 can, however, comprise at least one sensor 18 that is connected to the monitoring unit 16 and a computing module (typically in the form of a program that is implemented in a memory of the monitoring unit 16) that determines the position of the head preform 2T (at the beginning of production) or the tail preform 2Q (at the end of production) based on information that is communicated to it via the sensor(s) 18.

According to an embodiment, the sensor 18 comes in the form of a camera whose field of view encompasses the entire cavity 8, and the computing module integrates an image recognition program that makes it possible to determine the instantaneous position of the head preform 2T or, respectively, the tail preform 2Q.

According to another embodiment that is shown in a diagram in FIG. 5, the detection system 17 comprises a number of presence sensors 18, distributed along the path T opposite the cavity 8, and which are each configured to detect the presence (or absence) of a preform 2 in their vicinity.

The reception by the unit 16 for monitoring an absence signal repeated over multiple computing cycles, followed by the reception of a presence signal, characterizes the passage of the head preform 2T into the vicinity of the sensor 18 that has emitted these signals.

Conversely, the reception by the unit 16 for monitoring a presence signal (repeated over multiple computing cycles), followed by the reception of an absence signal, characterizes the passage of the tail preform 2Q into the vicinity of the sensor 18 that has emitted these signals.

According to an embodiment, the monitoring unit 16 is programmed to control, starting from an extinguished state of all of the emitters $E_1 \ldots E_N$:

The ignition of the emitter $E_{i+1}$ that is located immediately downstream from the head preform 2T (detected present in the cell $C_i$), while the emitters $E_{i+2} \ldots E_N$ that are located downstream from this emitter $E_{i+1}$ are kept extinguished and the emitters $E_1 \ldots E_{i-1}$ that are located upstream from this emitter $E_{i+1}$ are kept ignited;

And then the maintaining of this ignited state until the passage of the tail preform 2Q is detected.

Likewise, the monitoring unit 16 can be programmed to control, starting from an ignited state of all of the emitters $E_1 \ldots E_N$, the keeping of the emitter $E_{i-1}$ that is located immediately upstream from the tail preform 2Q (detected present in the cell $C_i$) ignited, while the emitters $E_1 \ldots E_{i-2}$ that are located upstream from this emitter are extinguished and the emitters $E_{i+1} \ldots E_N$ that are located downstream from this emitter $E_{i-1}$ are kept ignited.

It was noted that in the steady-state mode, i.e., when the cavity 8 is filled with preforms 2, the radiation that is emitted by each of the emitters $E_1 \ldots E_N$ is divided into three parts:

A first part that is absorbed (this is the objective of the heating) by the preform(s) 2 that is/are found opposite the emitter $E_i$;

A second part that is transmitted by the preform(s) 2 that is/are opposite the emitter $E_i$;

A third part that passes through gaps between the preforms 2.

The second part and the third part are sent back to the cavity 8 by the reflectors 13 of the emitters $E_i$, of the wall 6 that is located opposite. The reflections can be multiples, up to total absorption (or attenuation) of the radiation.

The radiation of each emitter $E_i$, is not strictly parallel but has divergent conicity. Thus, in a horizontal plane, the rays that laterally delimit the radiation form, with an axis that is perpendicular to the wall 6, an angle that is in general between 2° and 20°.

In other words, the electromagnetic power $P_C^i$ that is radiated by an emitter $E_i$ is not concentrated on the single cell $C_i$, but is dispersed in part toward the adjacent cells (at least $C_{i-1}$ and $C_{i+1}$).

The power that reaches the adjacent cells $C_{i-1}$ and $C_{i+1}$ is not the same depending on whether a preform is or is not present in the cell $C_i$. More specifically, the power fraction that reaches the adjacent cells $C_{i-1}$ and $C_{i+1}$ when no preform is present in the cell $C_i$ is greater than the power fraction that reaches these same cells when no preform is present in the cell $C_i$.

This explains the fact that, assuming that the emitters $E_j \ldots E_k$ that are located downstream and in the vicinity of the head preform 2T are ignited, the latter receives electromagnetic power that exceeds the power (so-called effective power) received by any preform 2 that is located in the core of the queue.

For the same reasons, if the emitters $E_l \ldots E_m$ that are located upstream from the tail preform 2Q are ignited, the latter receives electromagnetic power that exceeds the effective power.

The fact of gradually igniting the emitters $E_j \ldots E_k$ that are downstream and in the vicinity of the head preform 2T, or, respectively, gradually extinguishing the emitters $E_l \ldots E_m$ that are upstream from the tail preform 2Q makes it possible to bring the power that is received by the head preform 2T or, respectively, by the tail preform 2Q, to a value that is close to or equal to the effective power.

According to an embodiment that is illustrated in FIG. 5, it is feasible gradually to ignite, from upstream to downstream and as the queue of preforms 2 moves along, multiple emitters $E_l \ldots E_m$ that are located downstream and in the vicinity of the head preform 2T, by gradually increasing their respective provided electric power $P_E^k \ldots P_E^l$ close to the head preform 2T until nominal power is reached, at the earliest when the latter passes by.

Thus, in the example that is illustrated in FIG. 5, assuming that the head preform 2T is, at a given instant, located in the cell $C_i$, the monitoring unit 16 controls the passage from the extinguished state to the ignited state of the emitters $E_{i+1}$ and $E_{i+2}$, with:

$$0 < K_{i+2} < K_{i+1} < 1$$

with, typically:

$$10\% \leq K_{i+2} \leq 40\%$$

$$50\% \leq K_{i+1} \leq 80\%$$

and, for example:

$K_{i+2} \cong 20\%$ $K_{i+1} \leq 70\%$

In this way, everything takes place for the head preform 2T as if it were a preform 2 that is located in the core of the queue, in permanent mode, i.e., the head preform 2T receives the same amount of energy as a preform 2 that is located in the core of the queue.

According to a particular embodiment, the monitoring unit 16 can be programmed to increase in a continuous manner, from upstream to downstream, the electric power $P_E^i$ that is provided to the emitters $E_l \ldots E_m$ that are located downstream and in the vicinity of the head preform 2T close to the latter, by starting from the value zero to reach, at the earliest when the head preform 2T passes by, the nominal power $P_{Enom}^i$, as illustrated by the righthand part of the curve in dotted lines in FIG. 5.

Likewise, according to an embodiment that is illustrated in FIG. 5, it is feasible gradually to extinguish, from upstream to downstream, as the queue of preforms 2 moves along, multiple emitters$_l \ldots E_m$ [sic] that are located upstream and in the vicinity of the tail preform 2Q, by gradually reducing the respective provided electric power $P_E^l \ldots P_E^m$ thereof as the departure of the tail preform 2Q proceeds, starting from the nominal power to the zero value (i.e., until extinguishment).

In this way, everything takes place for the tail preform 2Q as if it were a preform 2 that is located in the core of the queue, in permanent mode, i.e., the tail preform 2Q receives the same amount of energy as a preform 2 that is located in the core of the queue.

According to a particular embodiment, the monitoring unit 16 can be programmed to decrease, in a continuous manner, from upstream to downstream, the electric power $P_E^i$ that is provided to the emitters $E_l \ldots E_m$ that are located upstream and in the vicinity of the tail preform 2Q as the departure of the latter proceeds, starting from the nominal power $P_{Enom}^i$ to reach a zero value, as illustrated by the lefthand part of the curve in dotted lines in FIG. 5.

The effect of this structure, and from operation thereof, is that the head preform 2T and the tail preform 2Q (as well as the preforms 2 that are adjacent to them in the queue) receive essentially the same amount of energy as the preforms 2 that are located in the heart of the queue. In this way, scrapping thereof is avoided, enhancing productivity.

In addition, the gradual ignition of the emitters $E_l \ldots E_N$ during the start-up of production and their gradual extinguishment during the end of the production make it possible to realize multiple energy savings, by reducing the overall ignition period of the emitters $E_l \ldots E_N$.

The invention claimed is:

1. Method for thermal conditioning of a queue of preforms of containers made of plastic material within a thermal conditioning unit that defines a heating cavity and that is equipped with a row of adjacent emitters that border the cavity and that each comprise a number of monochromatic electromagnetic-radiation sources,
   with each preform being attached to an individual support that travels from upstream to downstream along a predetermined path in the cavity, with the queue of preforms ending on the downstream side by a head preform or on the upstream side by a tail preform,
   with each emitter being able to adopt an ignited state, in which the electromagnetic-radiation sources emit radiation into the cavity, and an extinguished state, in which the electromagnetic-radiation sources do not emit radiation into the cavity,
   this method comprising:
   Periodically determining the position, on the path, of the head preform, or, respectively, of the tail preform;
   As the queue of preforms moves along, gradually igniting the emitters that are located downstream and in the vicinity of the head preform or, respectively, gradually extinguishing the emitters that are located upstream and in the vicinity of the tail preform.

2. Method according to claim 1, wherein the determination of the position of the head preform or the tail preform is made by means of one or more sensors.

3. Method according to claim 1, further comprising the ignition of the emitter that is located immediately downstream from the head preform, with the emitters that are located downstream from this emitter being kept extinguished and the emitters that are located upstream from this emitter being kept ignited.

4. Method according to claim 1, further comprising the gradual increase in electric power that is provided to multiple emitters that are located downstream and in the vicinity of the head preform that is close to the latter, until reaching a nominal power at the earliest when the latter passes by.

5. Method according to claim 1, wherein the ignited state of the emitters is maintained until the passage of the tail preform is detected.

6. Method according to claim 1, further comprising the keeping of the emitter that is located immediately upstream from the tail preform ignited, with the emitters that are located upstream from this emitter being extinguished and the emitters that are located downstream from this emitter kept ignited.

7. Method according to one of claim 1, further comprising the gradual reduction in electric power provided to multiple emitters that are located upstream and in the vicinity of the tail preform as the departure of the latter proceeds, from a nominal power until extinguishment.

8. Unit for thermal conditioning of preforms of containers made of plastic material, which defines a heating cavity and is equipped with:
   A row of adjacent emitters that border the cavity and that each comprise a number of monochromatic electromagnetic-radiation sources, with each emitter being able to adopt an ignited state, in which the sources emit radiation into the cavity, and an extinguished state, in which the sources do not emit radiation into the cavity;
   A series of individual supports for the preforms, traveling from upstream to downstream along a predetermined path in the cavity;
   further comprising:
   One or more sensors that are capable of making possible the periodic determination of the position, on the path, of a head preform, or, respectively, a tail preform within a queue of preforms that travel in the cavity;
   A monitoring unit that is programmed gradually to ignite the emitters that are located downstream and in the vicinity of the head preform or, respectively, gradually to extinguish the emitters that are located upstream and in the vicinity of the tail preform.

9. Thermal conditioning unit according to claim 8, wherein the sources are configured to emit in the infrared range.

10. Thermal conditioning unit according to claim 9, wherein the sources are VCSEL diodes.

11. Method according to claim 2, further comprising the ignition of the emitter that is located immediately downstream from the head preform, with the emitters that are located downstream from this emitter being kept extinguished and the emitters that are located upstream from this emitter being kept ignited.

12. Method according to claim 2, further comprising the gradual increase in electric power that is provided to multiple emitters that are located downstream and in the vicinity of the head preform that is close to the latter, until reaching a nominal power at the earliest when the latter passes by.

13. Method according to claim 2, wherein the ignited state of the emitters is maintained until the passage of the tail preform is detected.

14. Method according to claim 3, wherein the ignited state of the emitters is maintained until the passage of the tail preform is detected.

15. Method according to claim 4, wherein the ignited state of the emitters is maintained until the passage of the tail preform is detected.

16. Method according to 2, further comprising the keeping of the emitter that is located immediately upstream from the tail preform ignited, with the emitters that are located upstream from this emitter being extinguished and the emitters that are located downstream from this emitter kept ignited.

17. Method according to 3, further comprising the keeping of the emitter that is located immediately upstream from the tail preform ignited, with the emitters that are located upstream from this emitter being extinguished and the emitters that are located downstream from this emitter kept ignited.

18. Method according to 4, further comprising the keeping of the emitter that is located immediately upstream from the tail preform ignited, with the emitters that are located upstream from this emitter being extinguished and the emitters that are located downstream from this emitter kept ignited.

19. Method according to 5, further comprising the keeping of the emitter that is located immediately upstream from the tail preform ignited, with the emitters that are located upstream from this emitter being extinguished and the emitters that are located downstream from this emitter kept ignited.

20. Method according to claim 2, further comprising the gradual reduction in electric power provided to multiple emitters that are located upstream and in the vicinity of the tail preform as the departure of the latter proceeds, from a nominal power until extinguishment.

\* \* \* \* \*